United States Patent
Hettler

(10) Patent No.: US 6,802,497 B2
(45) Date of Patent: Oct. 12, 2004

(54) AGGREGATE BEARING IN BUSHING FORM

(75) Inventor: Werner Hettler, Mannheim (DE)

(73) Assignee: Carl Freudenberg KG, Weinheim (DE)

( * ) Notice: Subject to any disclaimer, the term of this patent is extended or adjusted under 35 U.S.C. 154(b) by 0 days.

(21) Appl. No.: 10/117,666

(22) Filed: Apr. 4, 2002

(65) Prior Publication Data

US 2003/0001323 A1 Jan. 2, 2003

(30) Foreign Application Priority Data

Jun. 27, 2001 (DE) .......................................... 101 31 075

(51) Int. Cl.[7] .............................................. F16F 15/00
(52) U.S. Cl. .................................. 267/140.12; 267/293
(58) Field of Search ............................... 267/293, 294, 267/140.11, 140.12, 140.13, 141, 141.1

(56) References Cited

U.S. PATENT DOCUMENTS

| 4,575,114 A | * | 3/1986 | Camp | 280/124.152 |
| 4,756,514 A | * | 7/1988 | Kanda | 267/140.12 |
| 4,854,561 A | * | 8/1989 | Kanda | 267/140.12 |
| 4,919,401 A | * | 4/1990 | Yano | 267/140.12 |
| 4,936,556 A | * | 6/1990 | Makibayashi et al. | 267/140.13 |
| 5,026,031 A | * | 6/1991 | Court | 267/140.12 |
| 5,080,330 A | * | 1/1992 | Nanno | 267/140.12 |
| 6,419,213 B2 | * | 7/2002 | Murai | 267/140.12 |
| 6,513,801 B1 | * | 2/2003 | McCarthy | 267/293 |

FOREIGN PATENT DOCUMENTS

| DE | 71 41 159 | 7/1972 |
| DE | 25 07 127 | 5/1976 |
| DE | 38 40 176 | 5/1990 |

* cited by examiner

Primary Examiner—Robert A. Siconolfi
(74) Attorney, Agent, or Firm—Kenyon & Kenyon

(57) ABSTRACT

An aggregate bearing (1) in bushing-form, having an outer ring (2) and an inner support element (4) and rubber springs (5, 6) arranged in-between, wherein the outer ring (2) is provided with cut-outs (10, 11) at least in the connecting regions (8, 9) of the rubber springs (5, 6), preferably in the main load direction (7); and the cut-outs (10, 11) are provided with end beads (12, 13) which project beyond the outer contour of the outer ring (2).

20 Claims, 10 Drawing Sheets

AGGREGATE BEARING IN BUSHING FORM

BACKGROUND OF THE INVENTION

1. Field of the Invention

The invention relates to an aggregate bearing in bushing form, having an outer ring and an inner support element as well as rubber springs positioned in-between.

2. Description of Related Art

In the known aggregate bearings of this kind, the rubber springs are vulcanized into the gap between the outer ring and the support element. This method tends to cause the rubber springs to shrink during the cooling of the bearing that follows vulcanization, resulting in an enlargement of the gap, which can have a disadvantageous effect on the desired bearing characteristics.

In order to avoid the above-mentioned disadvantage, it has become known from German Patent 3 840 176 C2 to insert an additional body into the then enlarged gap, thereby achieving an elastic prestressing. This measure results in an early onset of the progression in the pull direction of the bearing. Calibration makes it possible to design and install the aggregate bearing without an additional element. However, because of the calibration, the gap either must be entirely or at least partially eliminated. This creates difficulties in those cases where the gap reaches larger dimensions of up to 4 mm, for example. The gap size is made up of two parts, one of them being the already mentioned shrinkage measurement of up to 2 mm, and the minimal measurement required for production-related reasons for producing the axial penetrations at the rubber springs. The calibration is especially difficult when the outer ring is provided with a contoured elastomeric coating.

SUMMARY OF THE INVENTION

It is an object of the invention to create an aggregate bearing which can be produced in a cost-efficient manner and which avoids the disadvantages caused by the shrinkage of the rubber springs.

These and other objects of the invention are achieved in an aggregate bearing of the type mentioned at the outset by providing the outer ring with cut-outs, at least in the regions of rubber-spring connections in the main load direction, and providing the cut-outs with end beads projecting beyond the outer contour of the outer ring.

BRIEF DESCRIPTION OF THE DRAWINGS

The present invention will be described in greater detail with reference to the following drawings wherein.

DETAILED DESCRIPTION OF THE INVENTION

Figure 1:
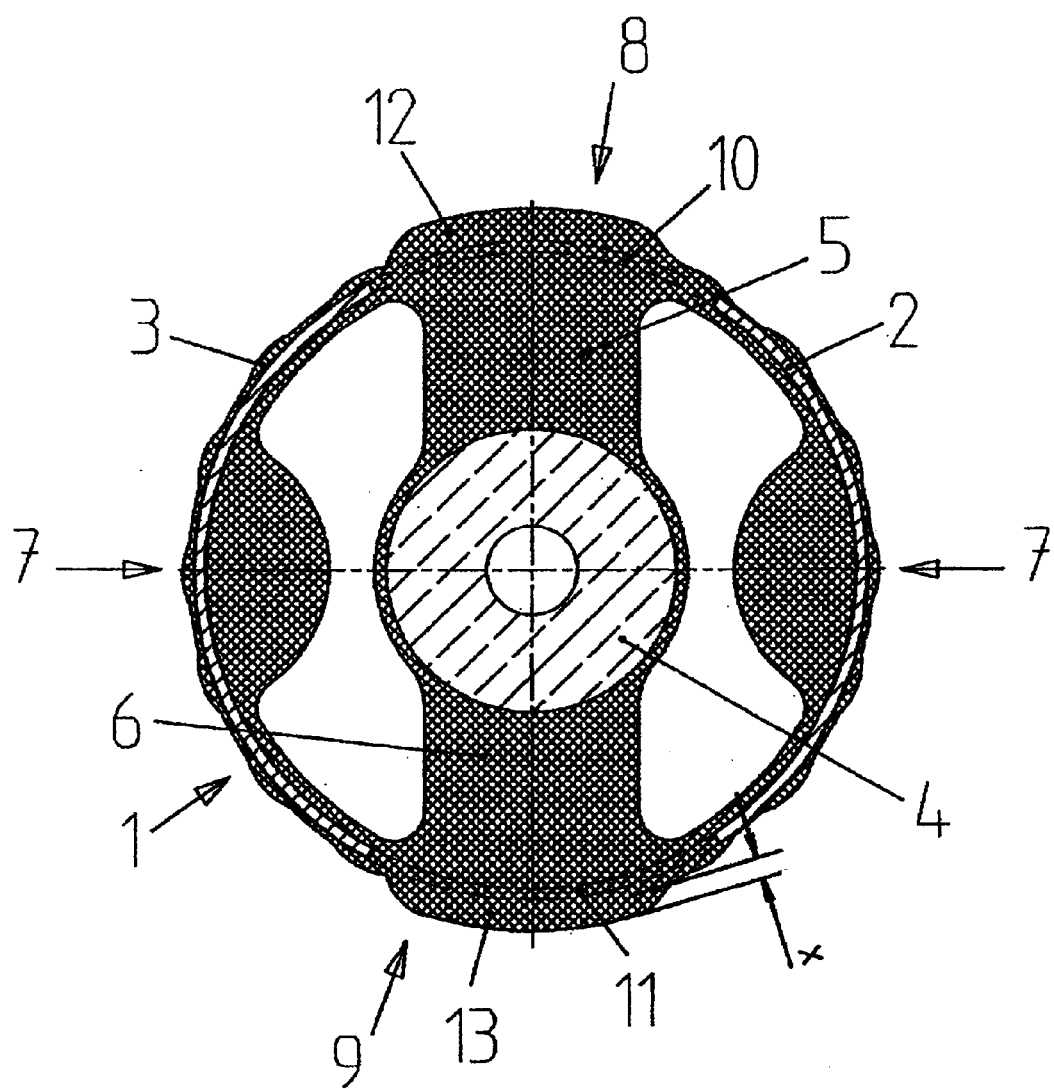
FIG. 1 shows a cross-section of an aggregate bearing for symmetrical tensile/pressure loads.

The new design preferably uses an outer ring coated with an elastomeric material, thus avoiding the relatively expensive corrosion protection required when using a metal ring without an elastomeric coating as an outer ring. By utilizing radially projecting end beads, the costly calibration may be omitted. During installation of the bearing in a corresponding mounting device, the end beads are pressed radially inward through the cut-outs in the outer ring, in this manner offsetting the shrinkage measurement of the rubber springs or perhaps even achieving a prestressing of the rubber springs. To this end, the gap between the end-bead height and the outer contour of the outer ring is chosen such that it is equal to the shrinkage measurement of the rubber springs caused by the vulcanization or is greater than the shrinkage measurement. The inventive idea therefore provides for designing at least one rubber spring of the bearing in such a way that its end bead reaches through a cut-out in the outer ring, which, after installation of the bearing in a mounting device, is pressed radially inward through the cut-out and in doing so, eliminates at least the shrinkage measurement. Given an appropriate shape and height of the end beads, the pressing-in can even exert prestressing on the rubber springs, which is desirable in a number of applications.

Developing the inventive thought further, it is even possible to apply a bead to the outer ring on the side facing away from the spring. In this case, the bead is separated from the rubber spring. By installing the bearing in the mounting device, it is now possible, through the concomitant pressing-in of the end bead into the cut-out of the outer ring in the radial direction, to bridge not only the manufacture-related free path but also the enlargement of the separation gap caused by shrinkage. In this manner, the end bead comes to rest at the inner support element again. In the region(s) where the free gap between the outer ring and the inner support element is at its narrowest for production-related reasons, the outer ring in this case is provided with a plurality of cut-outs whose number corresponds to the number of regions. At the same time, the elastomeric coating of the outer ring has protuberances or enlargements in these areas, which at least fill the manufacture-related gaps between outer ring and support element when the bearing is installed.

To achieve a tight, concentric position of the aggregate bearing, the outer surface of the elastomeric coating of the outer ring is provided with elevations in a generally known way. These elevations extend, for instance, in wave form in the axial direction of the outer ring.

To achieve an additional restriction of the free path of the inner support element transversely to the main operating direction, the outer ring in its walls positioned laterally to the main load direction may be provided with additional cut-outs, which are covered by bulges of the elastomeric coating and are pressed radially inward into the outer ring in the mounted position. In their shape, the bulges correspond approximately to the previously discussed end beads and can be pressed through the cut-outs of the outer ring radially into the bearing in the same manner. In this way, the correspondingly designed end stops will be employed earlier, transversely to the main load direction.

FIG. 1 shows a cross section of aggregate bearing 1 in bushing form in its unmounted state. The aggregate bearing essentially is made of outer ring 2 having elastomeric coating 3, and inner support element 4, as well as rubber springs 5 and 6. The forces exerted on bearing 1 in load direction 7 during operation are represented by arrows. In connecting regions 8 and 9 of rubber springs 5 and 6, cut-outs 10 and 11 are provided in outer ring 2. Rubber springs 5 and 6 reach through these cut-outs 10 and 11 with their end beads 12 and 13 and project beyond the outer contour of the outer ring formed by elastomeric coating 3. Distance X between the end bead height and the outer contour of outer ring 2 is chosen such that it is at least as large as the shrinkage measurement of rubber springs 5 and 6. If end beads 12 and 13 correspond in their height to the shrinkage measurement of springs 5 and 6, they are essentially pulled into cut-outs 10 and 11 of the outer ring by the shrinkage of springs 5 and 6. However, it is advantageous to choose a larger distance measure X, so that prestressing is already being exerted on springs 5 and 6 during the installation of aggregate bearing 1 in an appropriate mounting support.

Figure 2:
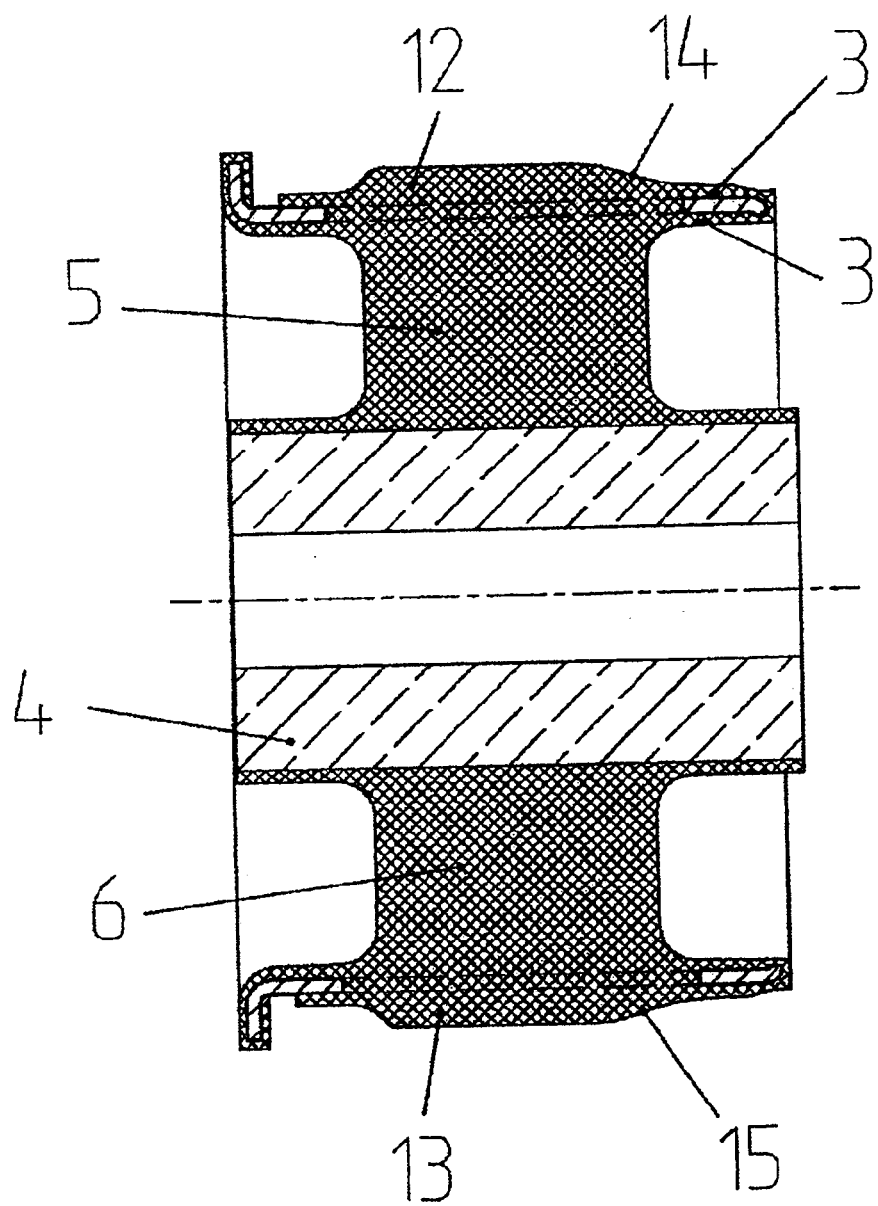
FIG. 2 shows a longitudinal cross-section of the aggregate bearing according to FIG. 1.

In FIG. 2, the bearing according to FIG. 1 is depicted in longitudinal cross section. Here, the longitudinal extension of rubber springs 5 and 6 can be seen, as well as the ramp-like design of end beads 12 and 13 on the left side of the Figure, denoted by numerals 14 and 15, which facilitates the installation of bearing 1 in its mounting device.

Figure 3:
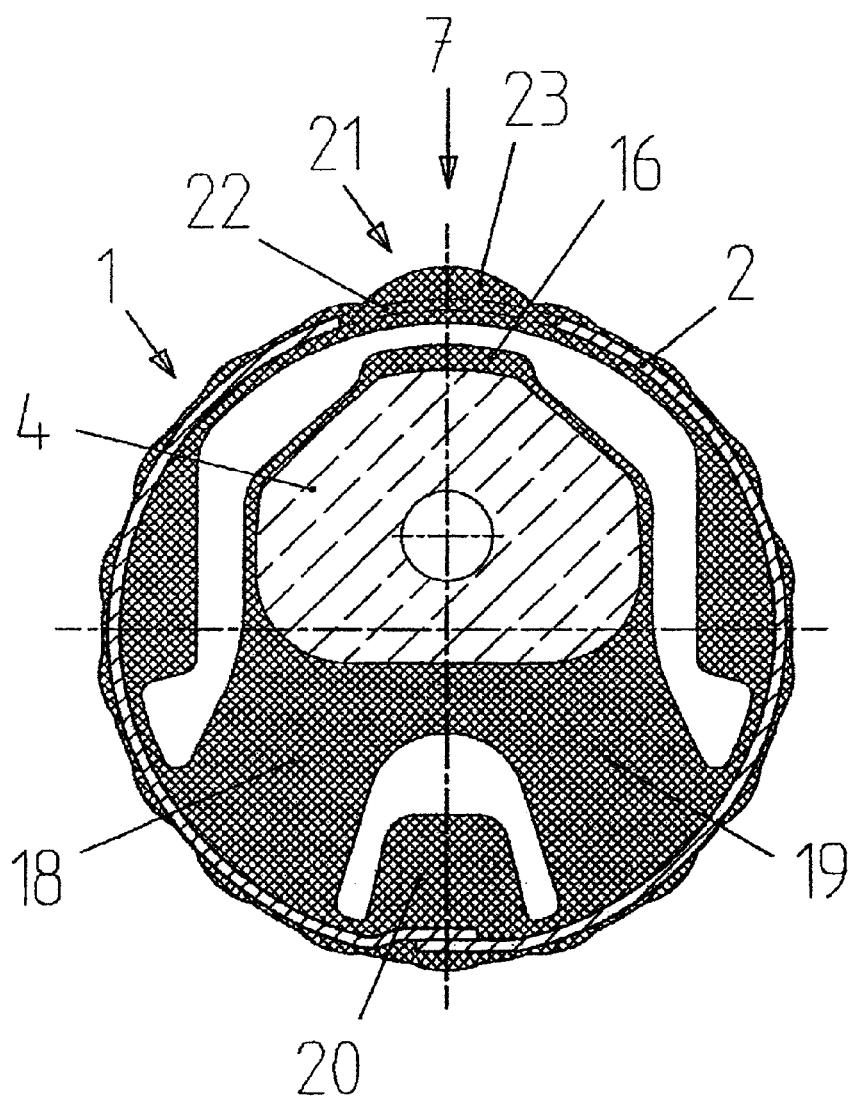
FIG. 3 shows a cross-section of an aggregate bearing for a large path of work in a radial direction.

FIG. 3 shows a cross section through an aggregate bearing 1 operating in main load direction 7. In this embodiment, pull end stop 16 is stub-shaped. The spring action here is mainly provided by springs 18 and 19, which are designed in V-shape as seen in cross-section. Pressure end-stop buffer 20 is inserted between springs 18 and 19. In region 21, outer ring 2 is provided with cut-out 22. Cut-out 22 is covered by end bead 23 which forms an integral part of outer ring 2. Rubber springs 18 and 19, for their part, are secured directly to outer ring 2, without cut-outs having been made in the outer ring. During installation of bearing 1 in a mounting device, end bead 23 is pressed into cut-out 22 and comes to rest against the radially extending outer surface of end stop 16. Through this design approach, the shrinkage measurement caused by the shrinkage of springs 18 and 19, as well as the free path created by the existing axial penetration 17 may be bridged when installing the bearing in a mounting device.

Figure 4:
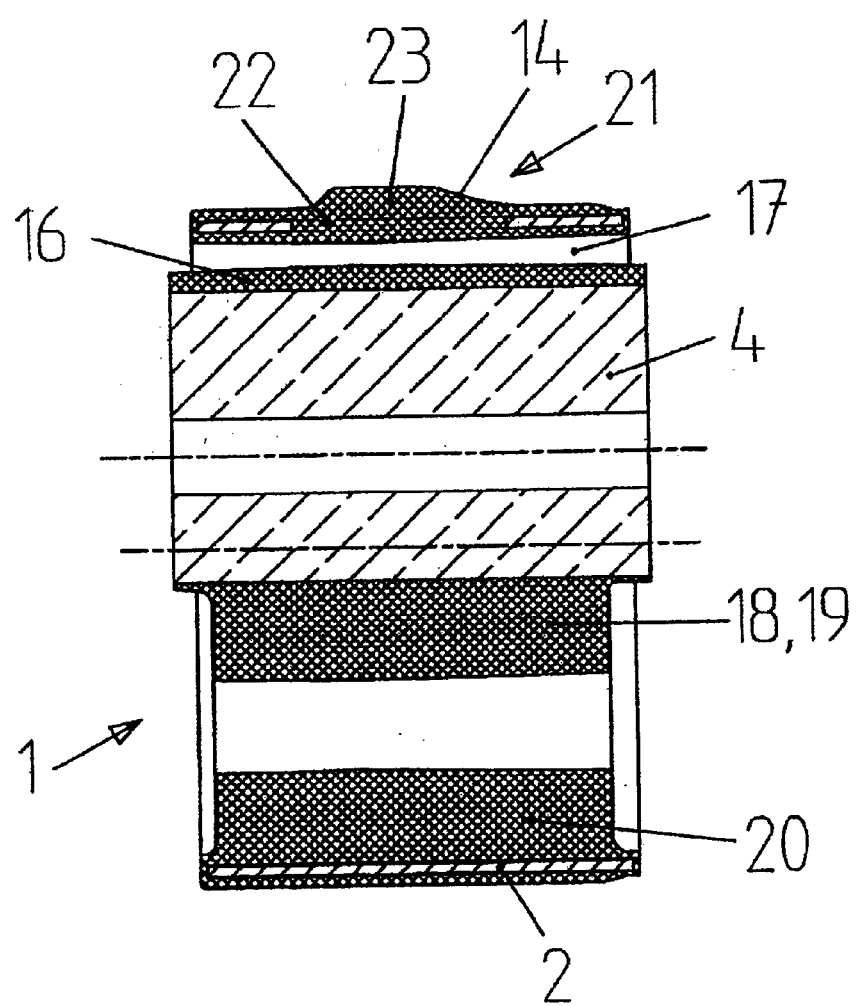
FIG. 4 shows a longitudinal cross-section of the aggregate bearing according to FIG. 3.

FIG. 4 shows a cross section of the embodiment of bearing 1 having axial penetration 17. End stop 16 is separated from end bead 23 by axial penetration 17. In order to nevertheless achieve an early onset of the progression in the pull direction, end bead 23 is provided; this, pressed inward during installation of bearing 1 in a holding device, rests against end stop 16 with its inner side. Springs 18 and 19 in this exemplary embodiment extend across the entire axial length of the bearing. However, for the desired characteristic curve it is sufficient if end bead 23, which cooperates with end stop 16, extends merely over the length of cut-out 21.

Figure 5:
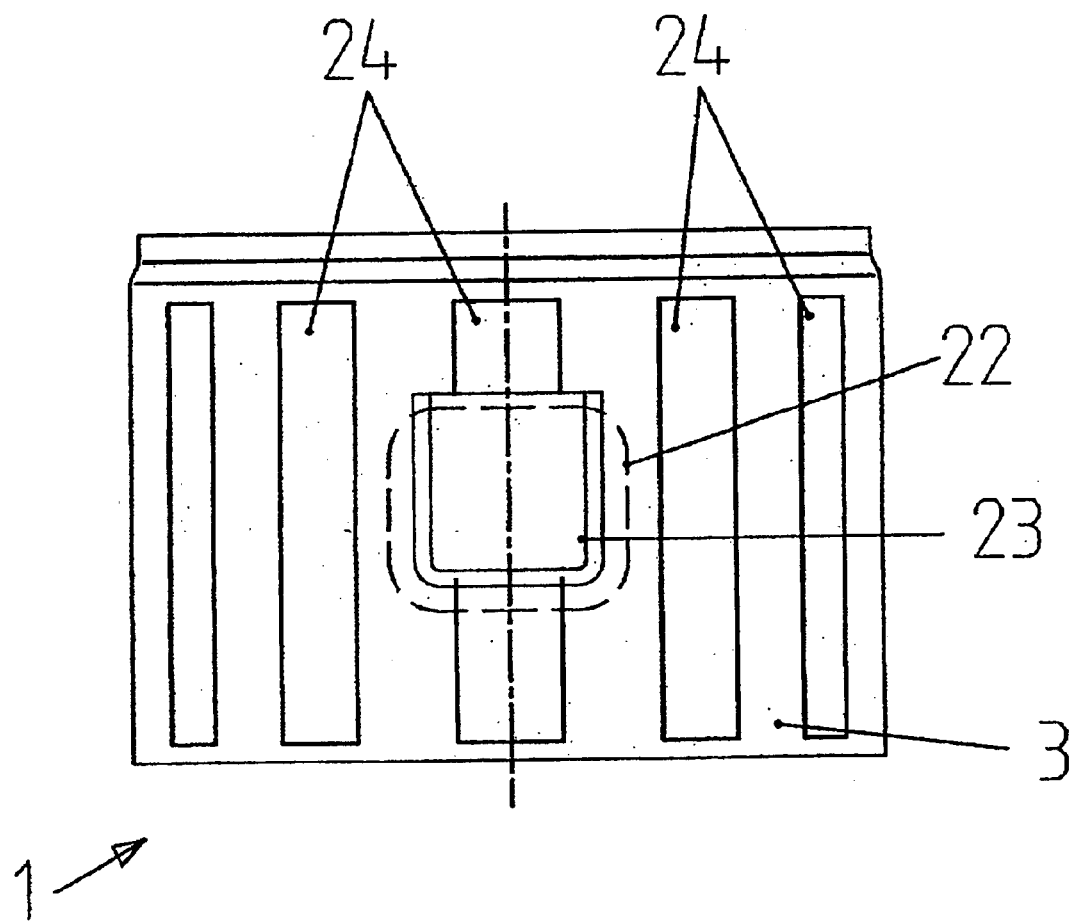
FIG. 5 shows a top view of the aggregate bearing according to FIG. 3.

In FIG. 5, the bearing of FIGS. 3 and 4 is shown in top view, so that the shape of end bead 23 and cut-out 22 is visible. Also clearly visible are protrusions or elevations 24 of elastomeric coating 3 of outer ring 2. As seen in the Figure, end bead 23 covers cut-out 22, with the upper portion inclined toward the top. This facilitates the insertion of bearing 1 in its mounting device.

Figure 6:
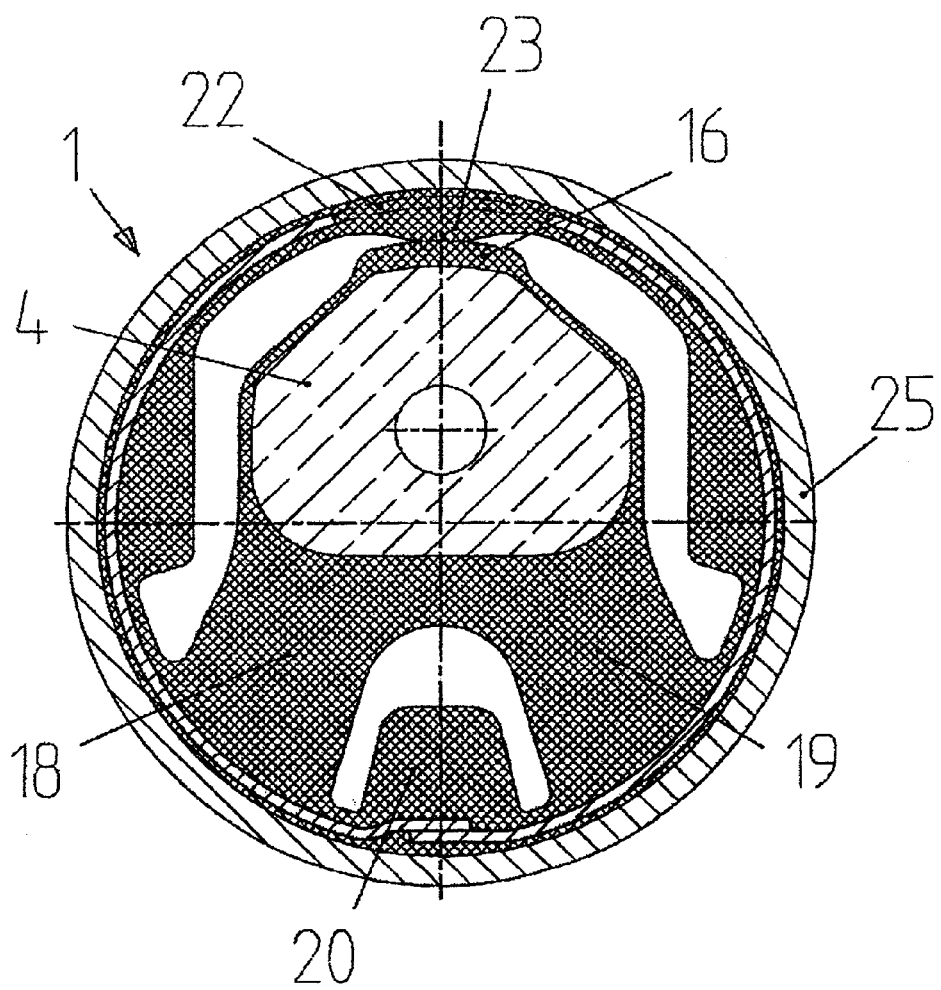
FIG. 6 shows the aggregate bearing according to FIG. 3 in cross section, installed in a mounting device.
Figure 7:
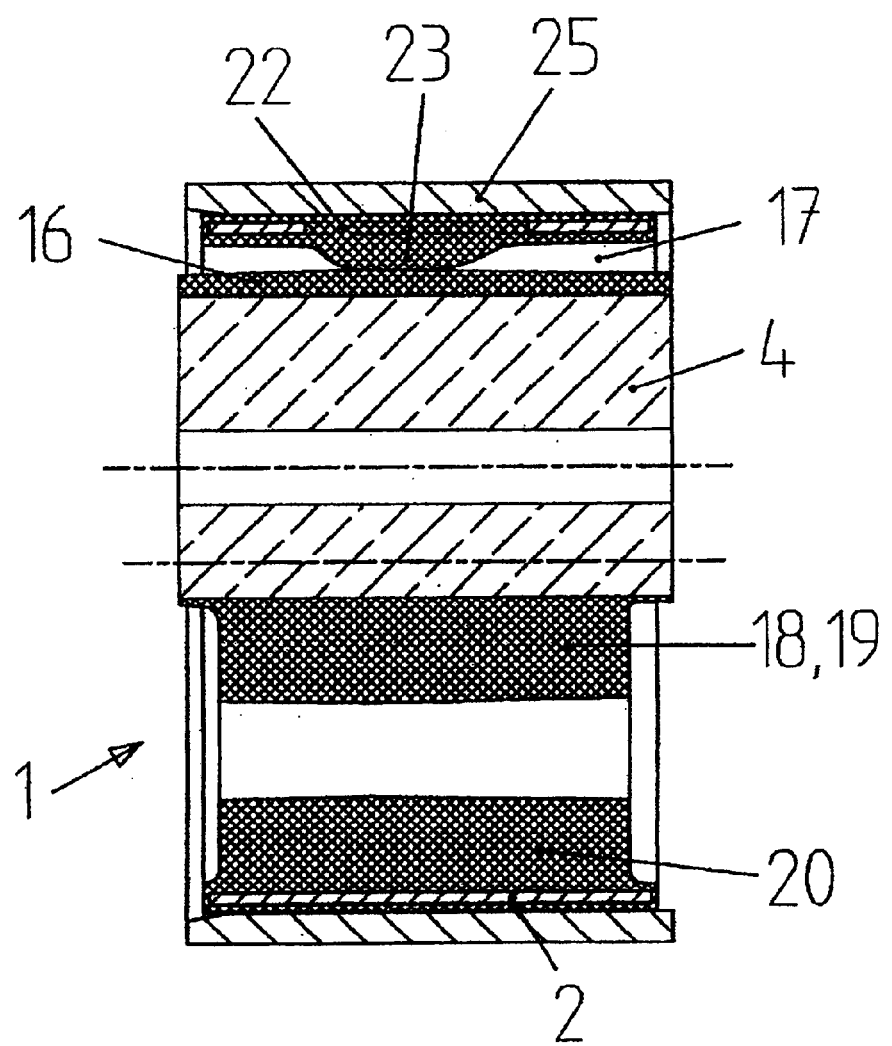
FIG. 7 shows a longitudinal section through the aggregate bearing according to FIG. 6.

FIGS. 6 and 7 show bearing 1 in cross and longitudinal section, respectively, installed in mounting device 25. End bead 23 is pressed through cut-out 22 and rests against end stop 16.

Figure 8:
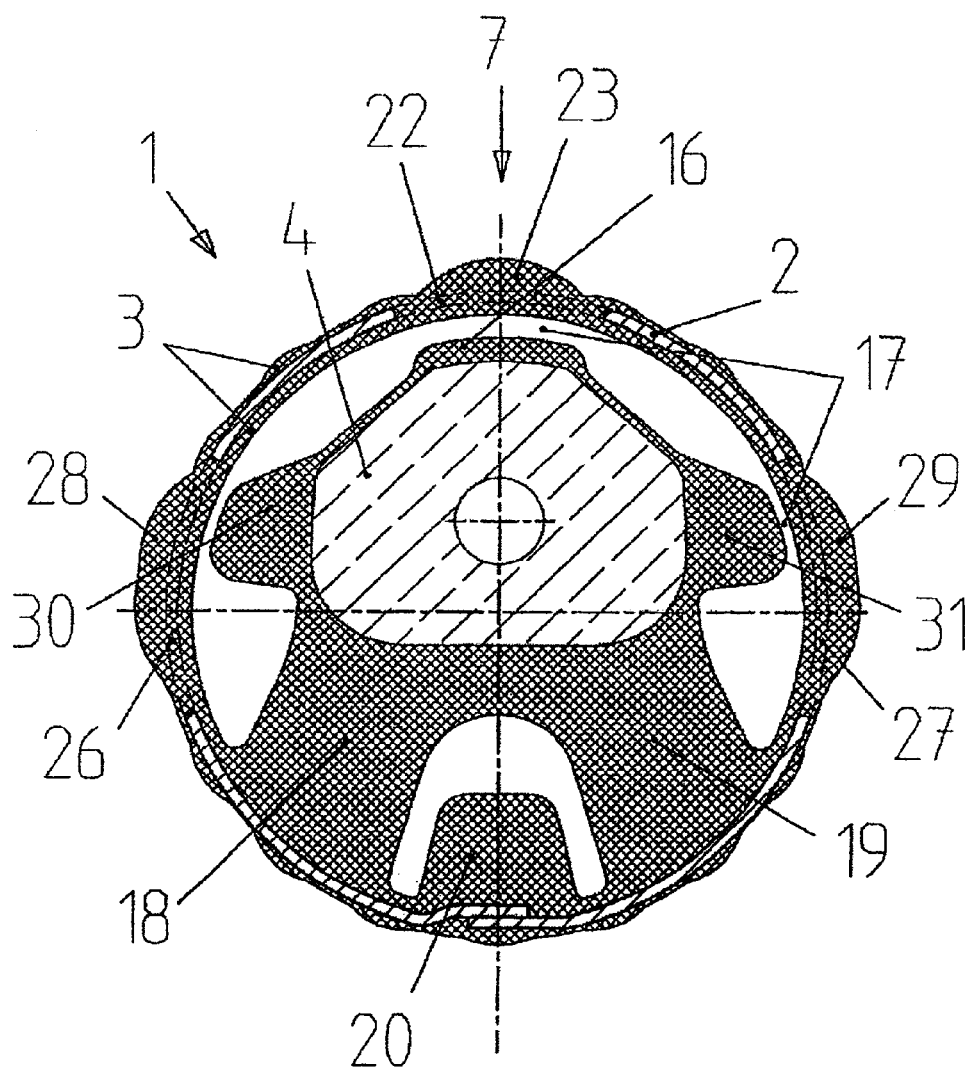
FIG. 8 shows an aggregate bearing in cross section with additional transverse path restriction.
Figure 9:
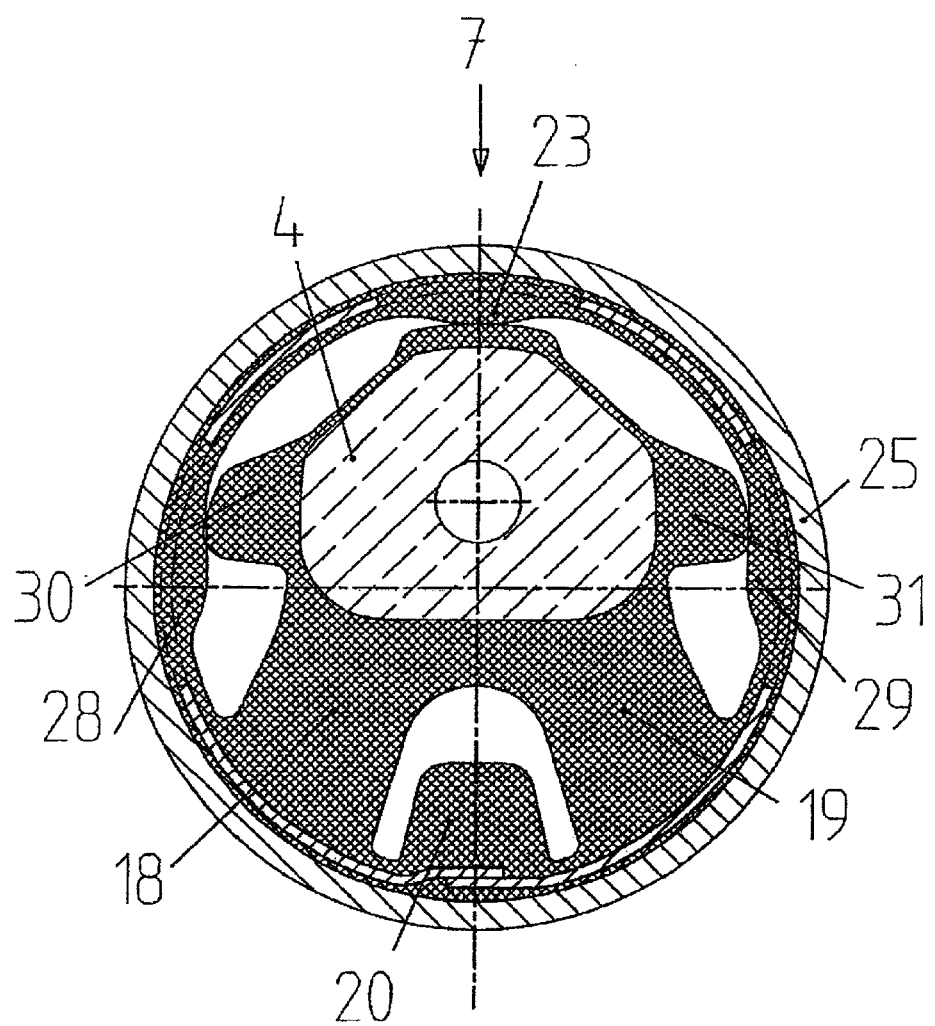
FIG. 9 shows the aggregate bearing according to FIG. 8 in its mounted state.

In FIGS. 8 and 9 an embodiment is shown through which the free path, created by the addition of axial penetration 17, is to be restricted. FIG. 8 shows bearing 1 after its completion, and FIG. 9 shows the bearing in its mounted state. The design of springs 18 and 19 as well as of outer ring 2 and inner part 4 including end beads 23 and cut-out 22 in outer ring 2 are comparable to the embodiment according to FIGS. 3 through 7. In addition, outer ring 2 has supplementary cut-outs 26 and 27 in its walls which are located laterally to main load direction 7. These are covered by bulges 28 and 29 of elastomeric coating 3 and, as can be seen from FIG. 9, are pressed inward into outer ring 2 in the mounted position, in a similar manner as the end beads. Inner part 4 is provided with lateral end stops 30, 31, against which bulges 28 and 29 come to rest in the mounted state. In this manner, an additional free path limitation can be provided for bearing 1 in the transverse direction.

Figure 10:
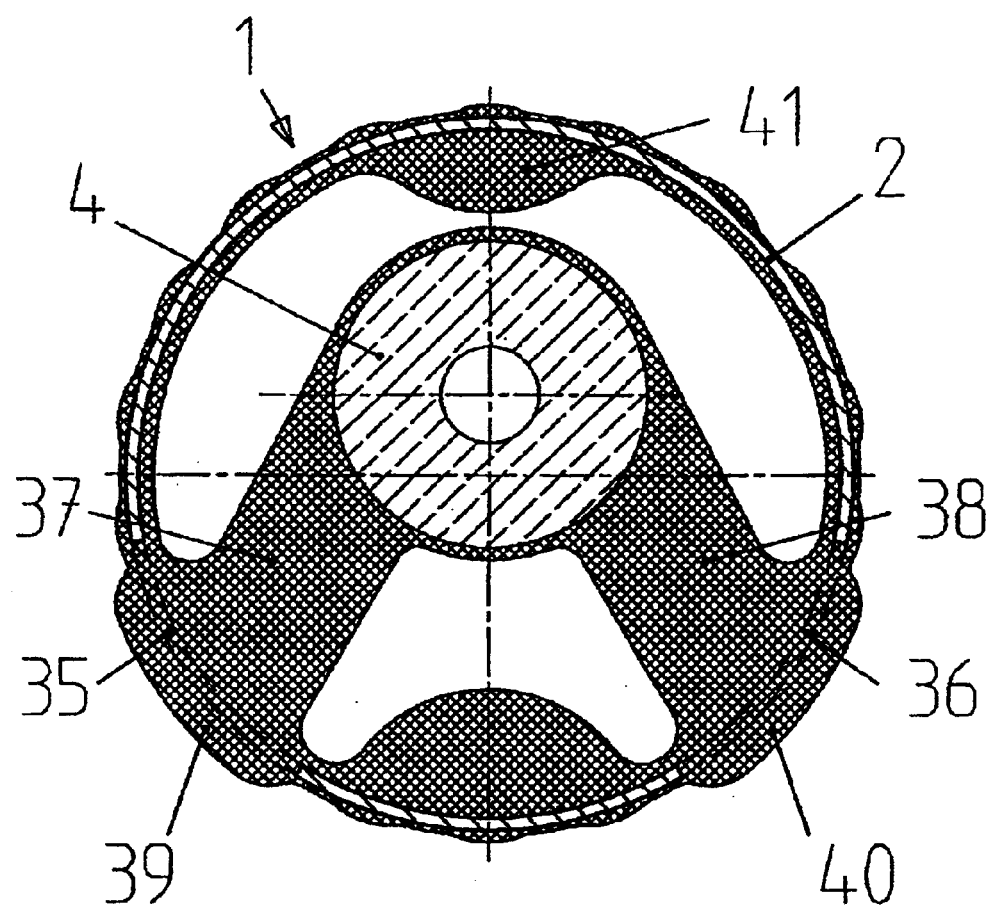
FIG. 10 shows an additional embodiment of the aggregate bearing in cross section.

FIG. 10 shows a further embodiment of bearing 1 in cross section. In this case, cut-outs 35 and 36 are located on the lower half of outer ring 2. There, v-shaped spring legs 37 and 38 of the rubber springs engage. Their end beads 39 and 40 project beyond the outer contour of outer ring 2. By installing bearing 1 in its mounting device, support element 4 is pressed upwards, via pressed-in end beads 39 and 40, against end stop 41 projecting inward. The gap between support element 4 and end stop 41 corresponds to production-related penetration 17 and the shrinkage measurement caused by cooling during production of bearing 1. This embodiment of bearing 1 achieves the same objective as described with respect to FIG. 3, and is merely realized by approaching the matter from a different angle.

The inventive thought may also be applied to aggregate bearings in which the outer ring has no elastomeric coating, for instance when no corrosion protection or compensation for tolerance are necessary.

What is claimed is:

1. An aggregate bearing in bushing-form, comprising an outer ring and an inner support element and rubber springs arranged in-between, wherein the outer ring is provided with cut-outs—at least in the connecting regions of rubber springs, and the cut-outs are provided with end beads located on an exterior part of the springs, the beads configured in a ramp shape which project beyond the outer contour of the outer ring, wherein the rubber springs directly contact the inner support element.

2. The aggregate bearing according to claim 1, wherein the cut-outs are disposed in a main load direction (7).

3. An aggregate bearing in bushing-form, comprising an outer ring and an inner support element and rubber springs arranged in-between, wherein the outer ring is provided with cut-outs at least in the connecting regions of rubber springs, and the cut-outs are provided with end beads which project beyond the outer contour of the outer ring, wherein the gap (X) between the end bead height and the outer contour of outer ring is equal to the shrinkage measurement of the rubber springs caused by vulcanization.

4. An aggregate bearing in bushing-form, comprising an outer ring and an inner support element and rubber springs arranged in-between, wherein the outer ring is provided with cut-outs at least in the connecting regions of rubber springs, and the cut-outs are provided with end beads which project beyond the outer contour of the outer ring, wherein the cut-outs are disposed in a main load direction, wherein the gap (X) between the end bead height and the outer contour of outer ring is equal to the shrinkage measurement of the rubber springs caused by vulcanization.

5. An aggregate bearing in bushing-form, comprising an outer ring and an inner support element and rubber springs arranged in-between, wherein the outer ring is provided with cut-outs at least in the connecting regions of rubber springs, and the cut-outs are provided with end beads which project beyond the outer contour of the outer ring, wherein the gap (X) between the end bead height and the outer contour of the outer ring is larger than the shrinkage measurement of the rubber springs.

6. An aggregate bearing in bushing-form, comprising an outer ring and an inner support element and rubber springs arranged in-between, wherein the outer ring is provided with cut-outs at least in the connecting regions of rubber springs, and the cut-outs are provided with end beads which project beyond the outer contour of the outer ring, wherein the cut-outs are disposed in a main load direction, wherein the gap (X) between the end bead height and the outer contour of the outer ring is larger than the shrinkage measurement of the rubber springs.

7. The aggregate bearing according to claim 1, wherein the outer ring (2) is provided with an elastomeric coating (3).

8. The aggregate bearing according to claim 2, wherein the outer ring (2) is provided with an elastomeric coating (3).

9. The aggregate bearing according to claim 3, wherein the outer ring (2) is provided with an elastomeric coating (3).

10. The aggregate bearing according to claim 5, wherein the outer ring 92) is provided with an elastomeric coating (3).

11. The aggregate bearing according to claim 1, wherein the regions(s) of the free space between the outer ring and the inner support element, the outer ring is provided with a plurality of cut-outs, whose number corresponds to that of the regions; and the elastomeric coating of the outer ring in these areas has thickenings, which in the mounted bearing, at least fill the manufacture-related spaces between outer ring and support element.

12. The aggregate bearing according to claim 2, wherein in region(s) of the free space between the outer ring and the inner support element, the outer ring is provided with a plurality of cut-outs, whose number corresponds to that of the regions; and the elastomeric coating of the outer ring in these areas has thickenings, which in the mounted bearing, at least fill the manufacture-related spaces between outer ring and support element.

13. The aggregate bearing according to claim 3, wherein in region(s) of the free space between the outer ring and the inner support element, the outer ring is provided with a plurality of cut-outs, whose number corresponds to that of the regions; and the elastomeric coating of the outer ring in these areas has thickenings, which in the mounted bearing, at least fill the manufacture-related spaces between outer ring and support element.

14. The aggregate bearing according to claim 5, wherein in region(s) of the free space between the outer ring and the inner support element, the outer ring is provided with a plurality of cut-outs, whose number corresponds to that of the regions; and the elastomeric coating of the outer ring in these areas has thickenings, which in the mounted bearing, at least fill the manufacture-related spaces between outer ring and support element.

15. The aggregate bearing according to claim 7, wherein in region(s) of the free space between the outer ring and the inner support element, the outer ring is provided with a plurality of cut-outs, whose number corresponds to that of the regions; and the elastomeric coating of the outer ring in these areas has thickenings, which in the mounted bearing, at least fill the manufacture-related spaces between outer ring and support element.

16. The aggregate bearing according to claim 1, wherein additional cut-outs are provided in the walls of outer ring that are located laterally to a main load direction, these cut-outs being covered by the bulges of an elastomeric coating and, when pressed radially inward into the outer ring in the mounted position, form a limitation of the free path of the inner support element.

17. The aggregate bearing according to claim 2, wherein additional cut-outs are provided in the walls of outer ring that are located laterally to the main load direction, these cut-outs being covered by the bulges of an elastomeric coating and, when pressed radially inward into the outer ring in the mounted position, form a limitation of the free path of the inner support element.

18. The aggregate bearing according to claim 3, wherein additional cut-outs are provided in the walls of outer ring that are located laterally to a main load direction, these cut-outs being covered by the bulges of an elastomeric coating and, when pressed radially inward into the outer ring in the mounted position, form a limitation of the free path of the inner support element.

19. The aggregate bearing according to claim 5, wherein additional cut-outs are provided in the walls of outer ring that are located laterally to a main load direction, these cut-outs being covered by the bulges of an elastomeric coating and, when pressed radially inward into the outer ring in the mounted position, form a limitation of the free path of the inner support element.

20. The aggregate bearing according to claim 7, wherein additional cut-outs are provided in the walls of outer ring (2) that are located laterally to a main load direction 97), these cut-outs being covered by the bulges (28, 29) of the elastomeric coating (3) and, when pressed radially inward into the outer ring of the mounted position, form a limitation of the free path of the inner support element (4).

* * * * *

UNITED STATES PATENT AND TRADEMARK OFFICE
CERTIFICATE OF CORRECTION

PATENT NO.    : 6,802,497 B2
DATED         : October 12, 2004
INVENTOR(S)   : Werner Hettler It is certified that error appears in the above-identified patent and that said Letters Patent is hereby corrected as shown below:

Column 5,
Line 30, delete "92)" and insert -- (2) --;
Line 33, before "the regions(s)" insert -- in --;

Column 6,
Line 48, delete "97)" and insert -- (7) --;

Signed and Sealed this

Twenty-eighth Day of June, 2005

JON W. DUDAS
*Director of the United States Patent and Trademark Office*